Figure 1:
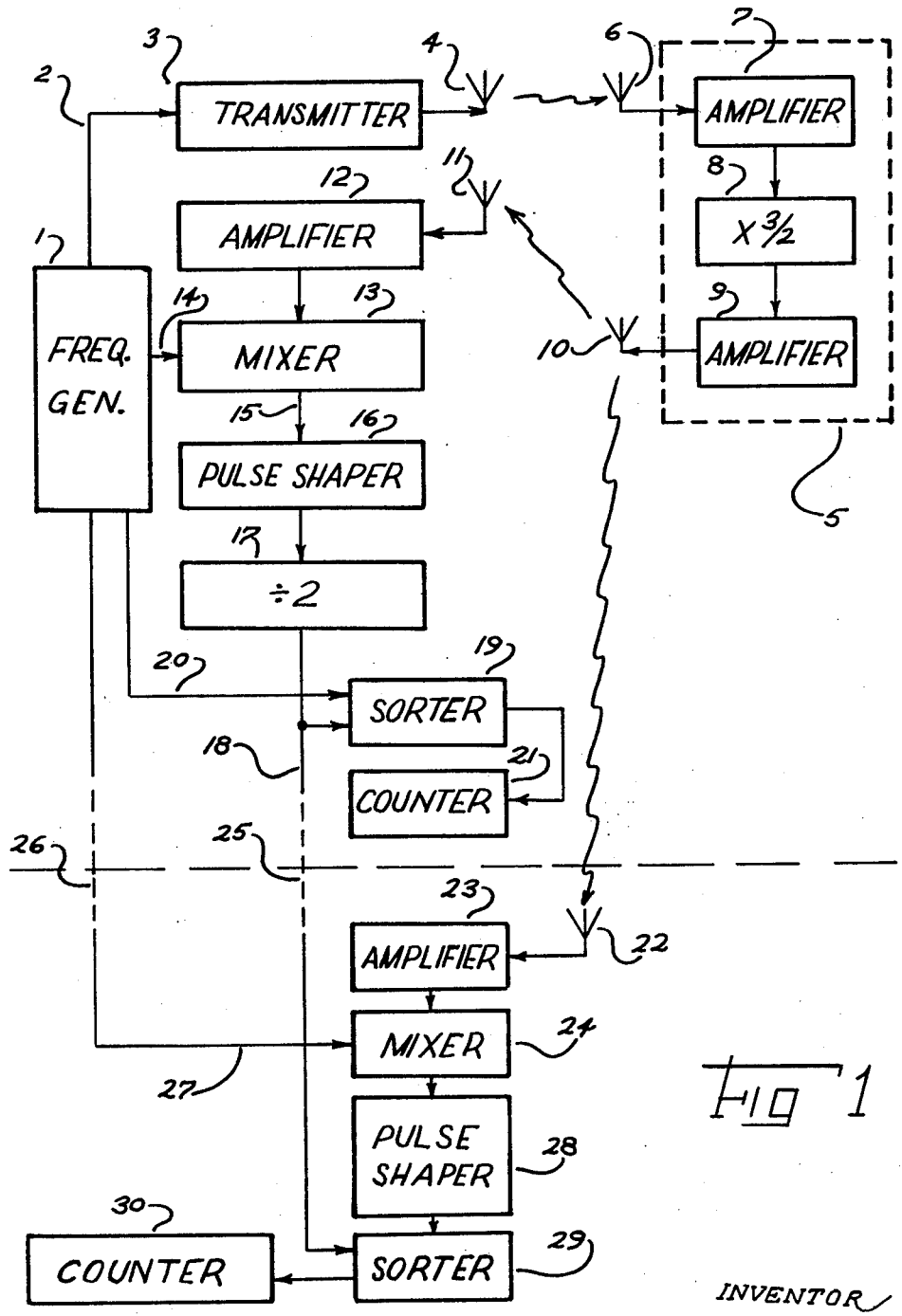

United States Patent Office 3,197,769
Patented July 27, 1965

3,197,769
DOPPLER MEASUREMENT SYSTEMS
Alexander Roth, 166 S. 2nd Ave., Fort Walton Beach, Fla.
Filed Sept. 6, 1962, Ser. No. 221,739
4 Claims. (Cl. 343—6.5)

This invention relates to improvements in Doppler measurement systems employing radio. Specifically, the type of system considered is that which employs a C.W. (continuous wave) transponder, in the object to be tracked, and a Doppler frequency integrator to measure range or range variation. Several tracking stations are employed and each measures and records the absolute variation of slant range starting with some reference in space or time. With a sufficient number of tracks, simultaneous equations yielding the trajectory, may be solved.

Some prior systems require a source of radio frequency energy, of very precise frequency, in the tracked vehicle, and then at the ground station record and count cycles of Doppler frequency. A problem with these systems is the requirement for a very precise oscillator in the vehicle. Another problem is that as the range rate goes to zero, and/or reverses, the Doppler frequency also goes through zero, causing confusion in the recording and counting equipment.

Other systems use transponders to circumvent the requirement for a precise oscillator in the vehicle. The difficulty at low range rates still applies to these systems.

The present invention requires a single transponder in the tracked vehicle, which may work in conjunction with any number of tracking stations. The transponder re-broadcasts at a different frequency. The transponder consists of a receiver, a frequency multiplier, and a transmitter. The problem existing at low range rates with prior systems is solved by the use of "offset superheterodyning" which produces some specific frequency, the offset frequency (rather than zero c.p.s.) at a range rate of zero. The resultant frequency, the offset Doppler, varies about the specified value, higher or lower as the range rate varies through its positive and negative values. In order to extract true instantaneous range from the offset Doppler (after the signal is converted to pulses) pulses are cancelled from the offset Doppler at a rate exactly equal to the offset frequency. This is basically a pulse subtraction process, which can yield negative as well as positive values, and is accomplished with a pulse-differencer, or pulse-sorter, which is part of this invention. The output of the pulse sorter, which consists of the offset Doppler minus the offset frequency (true Doppler), goes to an accumulator or counter which in effect integrates the Doppler cycles and thereby stores slant range.

Since there are several tracking stations, the master station will be defined as that station where the C.W. transmitter is also located, with other stations termed slave stations. A problem ordinarily exists in that the signal received at slave stations contains a Doppler signal with two components, (1) a component due to radial velocities relative to the master station, and (2) a component due to radial velocities relative to the particular slave station. A feature of the present invention is that a certain signal, derived from the master station, is sent to the slave stations, to serve as a reference signal, and is used to cancel out completely the first Doppler component.

Variations of the above basic scheme suggest themselves, and will be described. The transmitter at the master station may be automatically shifted in frequency in such a manner as to guarantee that the frequency received at the transponder is constant, as is its re-transmission. This permits the design of a very narrow band transponder. Another improvement is a technique to correct for refraction by re-transmitting two frequencies, rather that one, and employing known relationship between Doppler refraction error and frequency to cancel the error.

Figure 2:
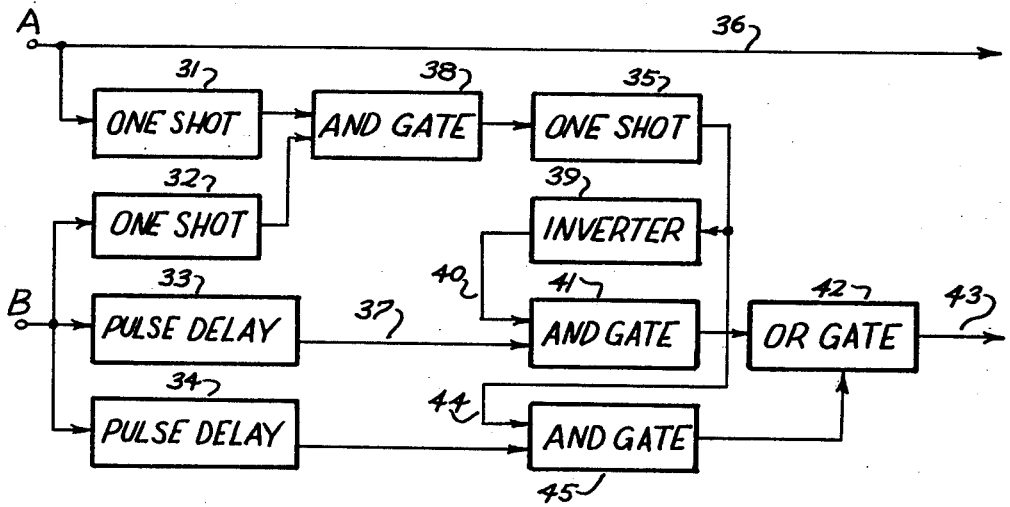
Figure 3:
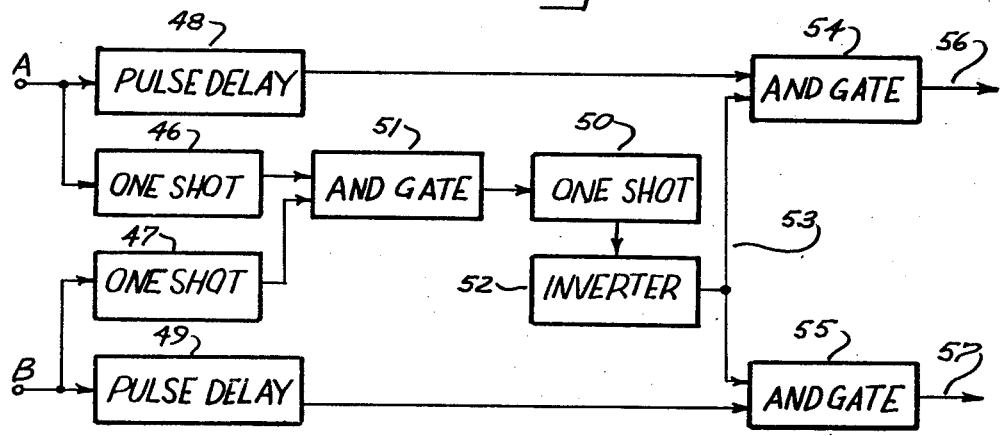
Figure 4:
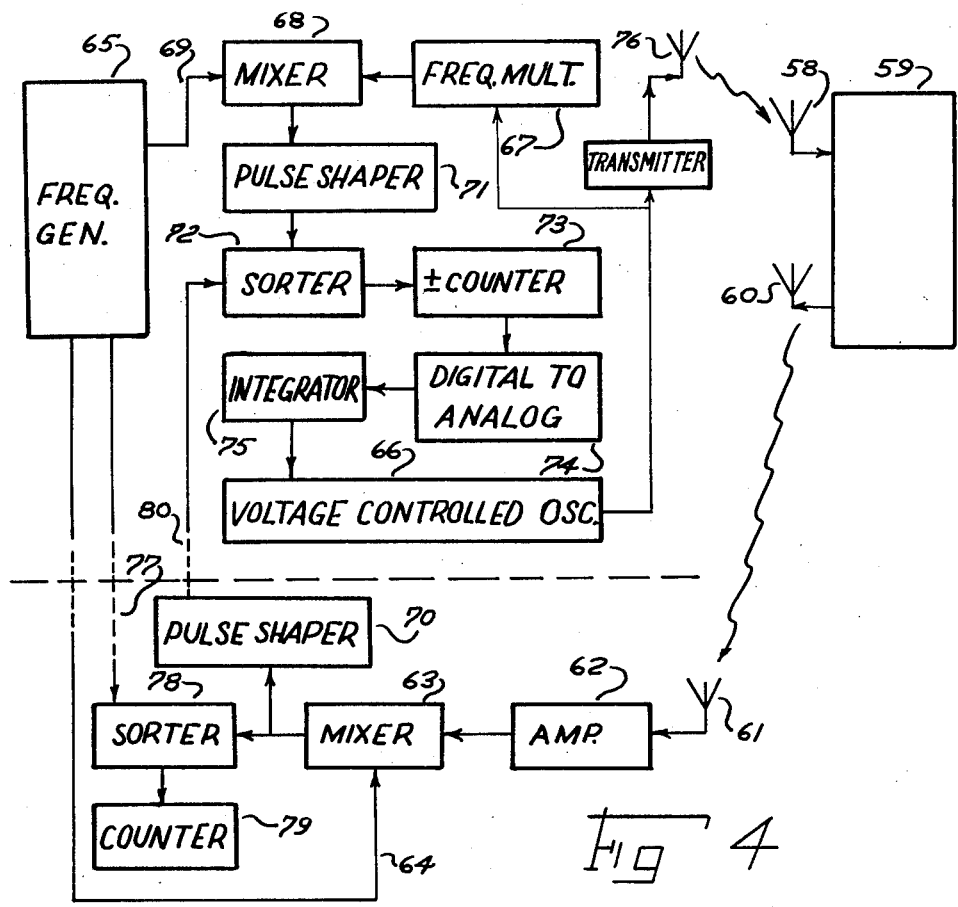
Figure 5:
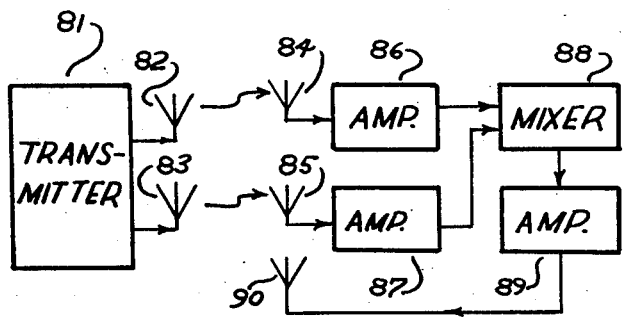

In order to more completely disclose the invention, reference will be made to the following figures in which FIG. 1 shows a C.W. transmitter, transponder and a master and slave receiver,
FIG. 2 shows a pulse sorter,
FIG. 3 shows an alternate pulse sorter, and
FIG. 4 shows a frequency shifting transmitter, transponder, and master and slave receiver,
FIG. 5 shows an alternate method for frequency multiplication in the transponder.

An embodiment of the present invention is shown in FIG. 1. Although certain frequencies and multiplication ratios will be considered in reference to FIG. 1, it is understood that these numbers are used only for explanatory purposes and do not restrict the generality of the principles.

A frequency generator, or synthesizer, shown at 1, generates coherent signals at various frequencies required for operation of the system. One of the outputs, at 2, is a frequency $f_1$, for example 200 mc. The transmitter 3 broadcasts from antenna 4 the frequency $f_1$.

The transponder 5 in the tracked vehicle receives its signal at antenna 6. The received frequency is $$f_1 + \frac{v_{ra}}{c} f_1$$

where $v_{ra}$ is the radial velocity of the vehicle with respect to the master station, and $c$ is the velocity of light. The term $$\frac{v_{ra}}{c} f_1$$

is the one way Doppler frequency D. Thus the received frequency is 200 mc.$+D$. The received signal is amplified by amplifier 7, and multiplied by some factor K, in this case 3/2, in frequency multiplier 8, again amplified by amplifier 9 and re-transmitted from antenna 10. The frequency re-transmitted is $$Kf_1 + K\frac{v_{ra}}{c}f_1$$

or 300 mc.$+D_{ha}$ where $D_{ha}$, the higher Doppler frequency relative to the master station, equals 3/2 D. The frequency received at the master ground station receiving antenna 11 is, after second order terms are neglected $$Kf_1 + 2K\frac{v_{ra}}{c}f_1$$

or 300 mc.$+2D_{ha}$. The signal is amplified in amplifier 12 and goes to mixer 13. In a conventional receiver, several mixers, or superheterodyne stages, would be used before the signal is converted into the audio region. For purposes of explanation, however, one single mixer, and one superheterodyning signal, will be considered, as they are mathematically equivalent to the conversion operation occupying several stages in a practical receiver. The superheterodyning signal on line 14 is generated with a value of exactly $Kf_1-2F$ where F is some nominal offset frequency of arbitrary value, greater than the maximum expected value of $D_{ha}$. If F is 10 kc., then the signal on line 14 is 299.98 mc. The difference output of the mixer 13 is selected, and on line 15 is a signal with the frequency $$2K\frac{v_{ra}}{c}f_1 + 2F$$

or $2D_{ha}+2F$. The signal then goes to a pulse shaper 16, a divide by 2 circuit 17, and produces pulses on line 18 with a frequency of $D_{ha}+F$, or $D_{ha}+10$ kc. These pulses then go to the pulse sorter 19 together with another output 20 from the frequency generator 1, at a frequency of exactly F, 10 kc. The sorter is a circuit which causes counter 21 to increase its count by one for each pulse on line 18, and decrease its count by one for each pulse on line 20. This is exactly equivalent to integrating the difference, or $$\int \left( K\frac{v_{ra}}{c}f_1 + F - F \right) dt$$

The result is $$\frac{K}{c}f_1 \int v_{ra} dt \text{ or } \frac{1}{\lambda_{300}} \Delta R_{ra}$$

or the accumulated slant range in units of the wavelength at 300 mc.

The bottom half of FIG. 1 shows one of a number of slave tracking stations. The signal is received on antenna 22, amplified in amplifier 23 and sent to mixer 24. The signal frequency is $$Kf_1 + K\frac{v_{ra}}{c}f_1 + K\frac{v_{rb}}{c}f_1$$

where $v_{rb}$ is the radial velocity to the particular slave station. The numerical value is 300 mc. $+D_{ha}+D_{hb}$ where $D_{hb}$ is the Doppler frequency caused by motion radial to the particular slave station. Lines 25 and 26 represent communication lines transmitting certain signals to the slave station. The signal on line 27 is equal to $Kf_1-F$, or 299.99 mc., generated by unit 1. It is actually unnecessary to transmit this high frequency on line 26, but a lower submultiple may be sent, and then multiplied at the slave station back to the proper frequency.

The output frequency from the mixer is $$K\frac{v_{ra}}{c}f_1 + K\frac{v_{rb}}{c}f_1 + F$$

or $D_{ha}+D_{hb}+10$ kc., and goes to pulse shaper 28. When the frequencies on the lines into sorter 29 are differenced in the sorter, and integrated in counter 30, the result is $$\int \left( K\frac{v_{ra}}{c}f_1 - K\frac{v_{rb}}{c}f_1 + F - K\frac{v_{ra}}{c}f_1 - F \right) dt \text{ or } \frac{K}{c}f_1 \int v_{rb} dt$$

or $(1/\lambda_{300})\Delta R_{rb}$, the accumulated slant range, in units of wavelength of 300 mc., with respect to the particular slave station.

The two pulse trains, going to each of the pulse sorters 19 and 29 described above, are generally of the same order of frequency, but incoherent with respect to each other. A consequence is that sometimes pulses from the two trains will occur coincidentally and confuse the differencing mechanism. This is avoided by the pulse sorter, and one version is shown in FIG. 2. A and B are two pulse trains such that a signal is desired which causes a counter, or accumulator to add one count for each A pulse, and subtract one count for each B pulse. One shots 31 and 32 produce a delay of intermediate length, pulse delay 33 produces a delay of short length, pulse delay 34 produces a delay of long length, and one shot 35 produces a delay of very long length. The very long delay however still represents a length of time considerably less than the minimum spacing between the pulses of either group A or of group B.

Whenever pulses on A or B are cleanly separated, the A pulse appears on line 36, and the B pulse appears at 37 after a short delay. Since coincidence gate (and gate) 38 was not energized, one shot 35 did not fire and inverter 39 causes line 40 to be energized permitting the pulses at 37 to pass through coincidence gate 41, and through OR gate 42, to line 43. Thus, add and subtract pulses appear at the output of the circuit of FIG. 2, cleanly separated, and cause no confusion with any following circuitry.

Whenever pulses on A and B are very close, the outputs from one shots 31 and 32 will at least partially coincide and produce an output from coincidence gate 38 and trigger one shot 35. This will energize line 44, de-energize gate 41, and energize coincidence gate 45. The B pulse after a long delay in pulse delay 34 can then get through gate 45 and thence to line 43. Pulses at the output are still cleanly separated, because of the delay of pulse delay 34, in spite of the fact that the pulses were originally coincident or nearly so.

FIG. 3 shows another possible configuration arranged to perform the function of a pulse sorter. The circuit of FIG. 3 however is different in that when incoming pulses are coincident or nearly so, no output, at all, is produced. At other times, the pulses themselves (delayed) are the outputs. One shots 46 and 47 have short delays, pulse delays 48 and 49 have identical intermediate delays, and one shot 50 has a long delay. The long delay however, is still a shorter time than the minimum time between the pulses within group A or group B.

When the A and B pulses are cleanly separated, there is no coincidence between the outputs of one shots 46 and 47, coincidence gate 51 is not energized, and one shot 50 is not energized. Inverter 52 thereby energizes line 53 permitting coincidence gates 54 and 55 to become energized. The A and B pulses thereby show up on the output lines 55 and 56, with delay, but still cleanly separated.

If the A and B pulses are coincident or nearly so, one shots 46 and 47 cause a coincidence in gate 51, and energize one shot 50 thereby de-energizing gates 54 and 55. Thus there is no output at all. Thus, either pulses come through the output, cleanly separated, or not at all. By inhibiting both pulses together, the proper arithmetic value is maintained in the counter.

FIGURE 4 shows a variation of the basic approach employing a transmitter whose frequency is shifted automatically to cause the frequency received at (and retransmitted from) the transponder to be a constant and essentially free of Doppler shift.

Assume the frequency received at the receiving antenna 58 of the transponder 59 is $f_1$, say 200 mc. and it rebroadcasts $Kf_1$, 300 mc., from antenna 60 if K is 3/2. The signal is received at antenna 61, at the tracking station, amplified in amplifier 62, and mixed in mixer 63 with the signal on line 64, of frequency $Kf_1-F$, or 299.99 mc., generated by frequency generator unit 65. Since the received signal is $$Kf_1 + \frac{v_{ra}}{c}Kf_1$$

the signal output from the mixer is $$\frac{v_{ra}}{c}Kf_1 + F$$

or in this example $D_{ha}+F$.

Assume that the voltage controlled oscillator 66 is generating a frequency of $$f_1 - \frac{v_{ra}}{c}f_1$$

or 200 mc.$-D_a$. This signal is then multiplied in frequency multiplier 67 by the same K factor as is used in transponder 59, giving a signal into the mixer 68 of $$Kf_1 - \frac{v_{ra}}{c}Kf_1$$

The frequency generator 65 sends a signal of $Kf_1+F$ on line 69 to mixer 68 thereby producing an output signal from the mixer of $$\frac{v_{ra}}{c}Kf_1 + F$$

the same signal as from mixer 63. The two sets of signals are converted to pulses in pulse shapers 70 and 71 and are then differenced in sorter 72. Any difference is accumulated, as an absolute value in forward-backward counter 73, and this difference is converted to an analog voltage in digital to analog converter 74. The voltage is integrated in integrator 75 and then controls voltage controlled oscillator 66. The direction of control is such that the count in counter 73 is always driven to zero forcing the above assumed frequencies to be the correct ones. Thus the frequency transmitted from antenna 76 always has a component equal to the Doppler shift to the transponder, but of the opposite sign, so that the signal received at the transponder 59 is constant.

The frequency generator sends a frequency F the offset frequency, on line 77 to sorter 78. The counter 79 thus accumulates the following integral:

$$\int \left(\frac{v_{ra}}{c} K f_1 + F - F\right) dt = \frac{K}{c} f_1 \int v_{ra} dt$$

or $(1/\lambda_{300}) \Delta R_{ra}$, the accumulated slant range to station A in units of 300 mc. wavelengths.

All slave stations are identical to the master receiving station (shown beneath the dashed line) and require the same signals as discussed for lines 64 and 77. No others, except the one located at the same place as the transmitter, need supply the signal on line 80. Because the re-transmitted signal is constant, all slave stations read proper slant range without requiring a signal such as on line 25 of FIG. 1, to cancel out the master station Doppler component of the re-transmitted signal.

Techniques of refraction correction may also be applied to the principles of this invention. The error, due to the decrease in propagation velocity as a result of differences in refractive index over the path of the signals, varies inversely with frequency. Thus by re-transmitting at two frequencies, this error can be made to reveal itself, and be cancelled. Assume re-transmissions are nominally at frequencies an octave apart. Also assume a fixed frequency transmitter as considered for FIG. 1, at 3. If the transponder frequency multiplier factors are K and 2K, the signals received at the master station would be (a) $\qquad \left(Kf_1 + 2K \frac{v_{ra}}{c} f_1 + 2\nu_a\right)$ and (b) $\qquad \left(2Kf_1 + 4K \frac{v_{ra}}{c} f_1 + \nu_a\right)$ where $\nu_a$ is the one-way value of refraction error frequency between station A and the transponder at the frequency $Kf_1$, and the Doppler values are the correct, or "vacuum" Dopplers. Using the numerical example, the lower signal would be $300 \text{ mc.} + 2D_{ha} + 2\nu_a$ and the higher would be $600 \text{ mc.} + 4D_{ha} + \nu_a$.

The next step is to superheterodyne each signal separately to some offset value to obtain respectively $$2D_{ha} + 2\nu_a + F_{ax}$$

and $4D_{ha} + \mu_a + F_{ay}$, where $F_{ax}$ and $F_{ay}$ are two new offset frequencies at station A. Then divide the first by 2 and mix (subtract) again, obtaining $3D_{ha} + F_{ay} - F_{ax}$. The signal may be multiplied by ⅓, with a circuit which cancels one pulse in every 3, giving $D_{ha} + (F_{ay} - F_{ax})/3$. This signal is then an input to a pulse sorter, to which another input is $(F_{ay} - F_{ax})/3$ generated by the frequency generator. The output from the sorter $D_{ha}$ goes to a counter, as previously discussed in connection with the system of FIG. 1, and provides accumulated slant range, free of refraction error.

For slave stations the procedure is somewhat more involved. The two groups of received signals are now (a) $\qquad \left(Kf_1 + K \frac{v_{ra}}{c} f_1 + K \frac{v_{rb}}{c} f_1 + \nu_a + \nu_b\right)$ and (b) $\qquad \left(2Kf_1 + 2K \frac{v_{ra}}{c} f_1 + 2K \frac{v_{rb}}{c} f_1 + \frac{\nu_a}{2} + \frac{\nu_b}{2}\right)$ where $\nu_b$ is the refraction error frequency in the path between the tracked vehicle and station B, in cycles per second. By superheterodyning and offsetting, the following signals are obtained, in terms of the numerical example (c) $\qquad (D_{ha} + D_{hb} + \nu_a + \nu_b + F_{bx})$ and (d) $\qquad (2D_{ha} + 2D_{hb} + \nu_a/2 + \nu_b/2 + F_{by})$ Mix with (subtract) respectively the following signals (e) $\qquad (D_{ha} + \nu_a + F_{ax}/2)$ and (f) $\qquad (2D_{ha} + \nu_a/2 + F_{ay}/2)$ which are exactly ½ of 2 signals which were generated at the master station discussed before. The results after mixing are (g) $\qquad (D_{hb} + \nu_b + F_{bx} - F_{ax}/2)$ and (h) $\qquad (2D_{hb} + \nu_b/2 + F_{by} - F_{ay}/2)$ Mix (subtract) ½ of (g) from (h) and obtain (i) $\qquad (3D_{hb}/2 + F_{by} - F_{ay}/2 - F_{bx} + F_{ax}/2)$ Multiply (i) by ⅔ using a digital circuit that cancels one pulse in every three and obtain (j) $\qquad ((D_{hb} + 2(F_{by} - F_{ay}/2 - F_{bx} + F_{ax}/2)/3))$ The term $2(F_{by} - F_{ay}/2 - F_{bx} + F_{ax}/2)/3$ is simply some new offset frequency, and this frequency may be supplied from the frequency generator to a pulse sorter, along with (j) to finally yield $D_{hb}$, which would then be integrated in a counter to yield accumulated slant range to station B.

Additional system performance improvement may be obtained through the use of a tracking receiver. In the examples discussed, the received signal itself was in all cases used for processing. By means of a tracking receiver, a local oscillator is forced to phase track the received signal, and then the local oscillator signal itself is processed. By this method, increased sensitivity is obtained and increased reliability because the local signal persists even though the received signal might temporarily undergo fading.

An alternate method to the use of a frequency multiplier in the transponder, which is shown in FIG. 5, is the transmission of 2 signals to the transponder, receiving them with two receivers, then mixing them, using one of the sidebands from the mixer and re-transmitting this signal. FIG. 5 shows the master transmitter 81 transmitting, for example, nominal frequencies of 100 mc. and 200 mc. through antennas 82 and 83. The signals are received respectively at antennas 84 and 85 and are amplified in amplifiers 86 and 87. The outputs of the amplifiers are mixed in mixer 88 to produce sideband frequencies of 100 and 300 mc. Amplifier 89 amplifies the 300 mc. component and retransmits it through antenna 90.

Having thus described what I believe are the best embodiments of my invention, I do not wish however, to be confined to the embodiments shows, but what I wish to cover by Letters Patent is set forth in the following claims.

I claim:

1. In a Doppler distance measurement system utilizing a stationary continuous wave transmitter, several stationary receivers, one of which, the prime receiver, is located at the transmitting station, a frequency generator which generates several frequencies one of which is used for transmission at the transmitter to a transponder located in the object to be tracked, said transponder containing means for receiving the signal, multiplying it to a new frequency proportional to the received frequency, and means for re-transmitting the signal at the new frequency, said re-transmitted frequency radiated to said prime receiver wherein a signal at a second frequency from the frequency generator is used to heterodyne the received signal by means of a signal mixer to a new frequency being some constant value plus the Doppler shift, said frequency generator supplying another signal at a third frequency which is precisely equal to the constant value of the heterodyned signal, said heterodyned signal and said third frequency signal applied to an accumulating counter in such a manner as to add one count for each cycle of the heterodyned frequency, and to subtract one count for each cycle of the third frequency, causing the accumulated tally of said counter to be proportional to range change.

2. In a Doppler distance measurement system as described in claim 1 wherein the re-transmitted signal from the transponder is radiated to other receivers than the prime one, where heterodyning is accomplished utilizing a signal from the frequency generator by means of a signal mixer, the heterodyned output from said signal mixer and a signal of ½ of the frequency of the heterodyned signal from the prime receiver are applied to an accumulating counter in such a manner as to add one count for each cycle of the signal from said signal mixer and to subtract one count for each cycle of the heterodyned signal from the prime receiver thereby causing the accumulated tally to exclude the Doppler frequency component due to motions of the transponder relative to the transmitter, and to exclude the constant value frequency, allowing only a count proportional to range changes to said receiver.

3. In a Doppler range measurement system as described in claim 1 wherein two signals of different frequencies are transmitted to the transponder, with means for receiving and amplifying each signal, means for heterodyning one with the other by means of a signal mixer, filtering means for selecting either the sum or difference of the resulting signal and means for re-transmission of the signal.

4. In a Doppler range measurement system as described in claim 1, means for automatically varying the frequency of the stationary transmitter so that the frequency arriving at the transponder is constant and free of Doppler shift, by means of an amplifier to receive the re-transmitted signal, a signal mixer to heterodyne the signal to some convenient value, a frequency multiplier to multiply the transmitted frequency by the same value of multiplication as is used in the transponder, another signal mixer to heterodyne the multiplied signal, both signals are applied to an accumulating counter in such a manner as, to add one count for each cycle of one frequency, and subtract one count for each cycle of the other, the algebraic tally of said counter controlling the frequency of the transmitter by means of a voltage controlled oscillator, said signal mixers fed with conversion signals from a frequency generator, one of said signals being the nominal transmitted frequency plus some constant value, the other being the nominal transmitted frequency minus the same constant value.

No references cited.

CHESTER L. JUSTUS, *Primary Examiner.*